UNITED STATES PATENT OFFICE.

DANIEL E. SOMES, OF WASHINGTON, DISTRICT OF COLUMBIA.

IMPROVEMENT IN THE MANUFACTURE OF ICE, AND IN COOLING AIR AND OTHER SUBSTANCES.

Specification forming part of Letters Patent No. 68,908, dated September 17, 1867.

*To all whom it may concern:*

Be it known that I, DANIEL E. SOMES, of Washington, in the District of Columbia, have invented a new and useful improvement in the manufacture of ice, in heating, cooling, and refrigerating, the same being applicable in cooling air, gases, vapors, liquids, and solids; and I do hereby declare the following to be a full, clear, and exact description thereof.

The nature of my invention consists in cooling and refrigerating by the use of liquid atomized in the form of spray or mist, produced by means of forcing any liquid, by the action of a blast of air, or gases or their equivalent, through atomizing-tubes, or through gauze or small holes. By this means liquid is readily converted into vapor, and in becoming vapor a large quantity of heat becomes latent, and all surrounding bodies are cooled.

To enable others to use my invention, I will proceed to describe its application in the improvement of the following mechanic arts, processes, and manufacture:

First, for cooling air: This I accomplish by forcing or drawing atomized or vaporized spray through tubes or channels surrounded by the air to be cooled, or against or around tubes or channels containing the air to be cooled.

Second, for cooling liquids: This is accomplished by passing through the liquid to be cooled tubes or channels, through which is forced the atomized spray or vapor, or the spray is forced against or around tubes or channels containing liquids. Beer-coolers and other liquid coolers come under this head.

Third, condensing vapors in the process of distillation: In the distilling apparatus the atomized liquids and vapor take the place of the ordinary cold water which surrounds the worm of the still or its equivalent part.

Fourth, for cooling and refrigerating buildings and apartments: For this purpose the air cooled by the spray is conducted through tubes or channels, which run through the refrigerating apparatus to the apartments to be cooled; or liquid or air may be conducted in like manner through the refrigerating apparatus in tubes or channels, which are surrounded or inclosed by tubes or channels of a larger size, so that air may be forced or drawn through the space betweed the larger and smaller tubes. If the smaller tube is covered by tow, hemp, or other fibrous substance, and kept moist by means of water admitted through perforated pipes or otherwise, as set forth in a patent already granted to me, the air or liquid in the smaller pipe will be still further cooled by means of evaporation; but this device I claim only in combination with the devices and processes above and hereinafter described.

I will now describe the apparatus used for producing refrigeration.

I construct, of iron or other suitable material, so as to be air and water tight, an annular or oval, tubular, or otherwise shaped chamber, having a cross-section of a form and size most convenient for the purpose to which it is to be applied—as, for instance, in the freezing of cream a comparatively small area of cross-section would be required, while for the manufacture of ice for the market and for cooling large buildings it might be necessary to have the chamber large enough to admit the body of a man so that he could have ample room to work, the size depending on the nature of the desired result.

At a given point in this chamber are placed one or more suction and force pumps, or their equivalents, so arranged in or at a partition dividing the chamber that no communication can be had from one side to the other, except through the pumps, by the induction and ejection openings, which are on opposite sides of the partition. At another point in the chamber is another partition, minutely perforated or sustaining a series of atomizing-tubes passing through the partition.

The floor of the chamber is inclined in such a manner that there is a fall around from the side of the perforated partition to the induction side of the pumps, so that the cooling-liquid, after being forced through the perforated partition, may run down to the pumps, to be drawn in and used over again.

The induction and ejection openings of the pumps being larger in area than the sum of the atomizing perforations of the partition, the pumps in working will create a partial vacuum between their induction side and the perforated partition, and thereby cause a depression of temperature in that division of the chamber, while the contrary effect is produced on the ejection side of the pumps, between it and the perforated partition, during the pressure in that division of the chamber. This pressure causes the liquid to fly in spray through the above-named perforations, still further depressing the temperature in that division of the chamber which I have denominated the vacuum, when the pumps again take it up, and the operation is repeated.

The action of the pump is regulated by a fly-wheel, which revolves in a chamber from which the air is exhausted, so that the wheel may be in a vacuum, or partial vacuum, which is produced by the action of a pump, in order that it may meet with as little resistance as possible during its operation.

Cases are constructed extending into the chamber from the outside, so as to be entirely and tightly closed on all sides within the chamber, with an opening on the outside in which to insert a pan or drawer. These are built in the chamber in that division which is to be the cooling one. Between the induction of the pump and the perforated partition the drawers or pans are to contain water or cream, or other substances intended to be cooled; and when they are inserted in the cases all openings are closed and packed to exclude the external air and prevent the cool air within from escaping. The cases which contain the drawers and extend into the cooling-chamber are separated from each other by a space large enough to permit the cooling influence of the inside of the chamber to be exercised on all sides of them.

Tubes containing air or liquids are extended through the cooling-chamber for the purpose of conducting their contents, after being cooled, to any apartment or place desired. The contents of tubes in this case, whether air or liquid, or both, have no communication with the inside of the chamber further than is due to the cooling influence upon the tubes containing such air or liquid, and may be forced or drawn, by means of blowers or pumps, or their equivalents, to the points required, whether it be for cooling apartments or liquid, as brine in packing-houses, beer-tanks, and the like, or for other purposes.

Any liquid of a volatile nature may be used for atomizing—as ether, ammonia, hydrocarbon, alcohol, carbonic acid, sulphurous acid, chloroform, and the like, or water, either singly or in combination with each other or with other liquids or gases; and so long as the pump is in motion the process of cooling is continued without the loss of liquid or gas, since they are used over and over again.

On the side of the chamber where compression takes place, between the ejection side of the pump and the perforated partition, the heated air may be conducted away through tubes or otherwise, to be used for warming purposes, or the heat may be reduced by a stream of cold water, a blast of air, a packing of ice, or ice and salt, or other cooling agent.

To prevent the accession of heat to the cooling-division of the chamber from the external air or from the compressing-division, it may be found expedient to surround this with a non-conducting jacket, as air-spaces between walls, or non-conducting material, as wood, felt, tow, or any fibrous material.

On board of steamships or railway-cars and similar means of transportation such things as fruit, meat, and other kinds of food, or other articles of a perishable nature, may be effectually preserved by having the cooling-chamber so constructed as to pass through or around the space in which such articles are packed, while the pumps may be operated by the power from the engine, by the car-wheels, or any other motive power.

It should be here remarked that I do not intend to confine the use of a vacuum-chamber for a fly-wheel to pumps for cooling apparatus, but intend it for use in all cases where a fly-wheel is employed.

Cases to receive drawers or pans similar to those in the cooling-division are constructed in the compressing-division, to be used for heating purposes, as the others are used for for cooling, so that freezing and heating may be going on at the same time in the same apparatus.

Two pipes from the interior of the chamber—one from the vacuum-division and one from the compressing-division—communicate with the external air, and are provided with stopcocks or valves, so that air may be let out of the compressing-division when it is expedient to equalize the vacuum and pressure; and when it is desired to increase the pressure, the pipe to the vacuum-division is opened, and the other is closed, when the pump will force the air thus let in to its induction side into the other division, until the pressure is as great therein as may be desired. A safety-valve should be inserted into the compressing-chamber, opening into the vacuum or elsewhere, to prevent explosion.

This system of cooling and refrigerating may be adopted with great advantage to patients in hospitals, especially in those in which a portion of the premises is set apart for the treatment of epidemic diseases—such as smallpox, cholera, and yellow fever—where it is of vital importance that only pure air should be allowed to enter, and be maintained at a temperature sufficiently low to annul the poison of the disease, while other apartments in the same building may be kept at a higher, though equally constant, degree of temperature, the degree of change from one apartment to another being so regulated by valves or registers in hot and cold air pipes as to be as gradual as may be desired.

By using multiple walls and air-chambers, and multiple windows and window-screens, as described in a patent granted to me in February, 1867, and by adopting the mode of introducing and purifying or medicating the air, and subjecting it to the warming or cooling influences of the herein-described apparatus, the temperature of the building will be more uniform and more easily regulated.

Pipes or tubes passing through the cooling and heating divisions of the chamber, conveying air that has been cooled and heated, may terminate in each apartment, and be provided with valves and registers, so that, by opening one pipe or the other, any degree of temperature may be secured in any one apartment, while the air in an adjoining room may be kept at a given number of degrees higher or lower than the first; and this difference may be continued, say, in a descending scale, at a uniform rate, through any number of apartments, until a temperature low enough to cancel the atmospheric poison of such a disease as yellow fever shall have been attained, when it may be regulated and pursued in the same manner as in the other rooms by valves or registers. In this manner degrees of temperature, suited to all classes of diseases, may be secured under one roof, so that no one degree of temperature can interfere with or militate against the advantage derived from another degree.

It is a well-known fact that yellow fever cannot exist where the temperature is low enough to produce frost; and that in localities where it sometimes rages, it will disappoar upon a sudden change of weather from hot to cold.

Vessels having yellow-fever cases on board strive to attain a northern latitude, as it is known to most ship-masters that the disease is killed by cold. It is, therefore, a desideratum that a low degree of temperature should be attained and preserved in latitudes where the condition of the air is favorable to the ravages of this terrible plague.

A patient suffering from yellow fever may be introduced, first, into a room having a temperature but little lower than that to which he has been used, and then, after a sufficient length of time, to another apartment still lower, and so on, until he reaches, gradually, the low degree necessary to kill the disease, without liability to take cold. Thus, yellow-fever patients, being placed in a hospital constructed and regulated in accordance with my inventions, will be free from malarious influences of the out-door atmosphere, and will be enabled to inhale air that is at once pure and adapted in temperature to their cases. Persons in health, too, dwelling in or resorting to buildings constructed upon these principles may escape this malignant scourge and defy its ravages while in its very midst.

Having thus described my invention, what I claim as new, and desire to secure by Letters Patent, is—

1. Cooling and refrigerating, and warming, substantially as herein described.

2. The process of cooling and warming, as herein described, consisting in forcing or drawing spray into a vacuum or partial vacuum, substantially as set forth.

3. Cooling, condensing, heating, and refrigerating by means of the apparatus, substantially as described.

4. The apparatus herein described, constituting a vacuum, and devices for producing spray, substantially as set forth.

5. A fly-wheel or balance-wheel revolving in a vacuum or partial vacuum.

D. E. SOMES.

Witnesses:
 CHARLES HERRON,
 SETH T. HURD.